US009078266B2

(12) United States Patent
Hu et al.

(10) Patent No.: US 9,078,266 B2
(45) Date of Patent: Jul. 7, 2015

(54) DEVICES AND METHODS FOR FACILITATING DISCONTINUOUS TRANSMISSION ON ACCESS TERMINALS

(71) Applicant: QUALCOMM Incorporated, San Diego, CA (US)

(72) Inventors: Jun Hu, San Diego, CA (US); Rashid Ahmed Akbar Attar, San Diego, CA (US); Donna Ghosh, San Diego, CA (US); Christopher Gerard Lott, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 13/777,762

(22) Filed: Feb. 26, 2013

(65) Prior Publication Data

US 2014/0105085 A1    Apr. 17, 2014

Related U.S. Application Data

(60) Provisional application No. 61/712,773, filed on Oct. 11, 2012.

(51) Int. Cl.
*H04W 72/04* (2009.01)
*H04B 7/212* (2006.01)
(Continued)

(52) U.S. Cl.
CPC ........ *H04W 76/048* (2013.01); *H04W 52/0225* (2013.01)

(58) Field of Classification Search
USPC .................................. 370/328, 329, 337, 347
See application file for complete search history.

(56) References Cited

U.S. PATENT DOCUMENTS 6,137,789 A    10/2000   Honkasalo
6,278,864 B1    8/2001   Cummins et al.
(Continued)

FOREIGN PATENT DOCUMENTS

AU    2004202732 A1    7/2004
EP       1932380 A2    6/2008
(Continued)

OTHER PUBLICATIONS

International Search Report and Written Opinion—PCT/US2013/063281—ISA/EPO—Jan. 30, 2014.
(Continued)

*Primary Examiner* — Andrew Lee
(74) *Attorney, Agent, or Firm* — QUALCOMM IP Department; James Hunt Yancey, Jr.

(57) ABSTRACT

Access terminals are adapted to facilitate discontinuous transmission (DTX). According to one example, an access terminal can employ a short timescale DTX mode and a long timescale DTX mode independent of one another. The access terminal can determine whether a first set of predetermined factors are present. When the first set of factors are determined to be present, the access terminal may enable a short timescale DTX mode, independent of whether a long timescale DTX mode is enabled or not. A determination may also be made whether a second set of predetermined factors are present. When the second set of predetermined factors are determined to be present, the access terminal may enable a long timescale DTX mode, independent of whether the short timescale DTX mode is enabled or not. Other aspects, embodiments, and features are also included.

39 Claims, 11 Drawing Sheets

(51) Int. Cl.
*H04W 76/04* (2009.01)
*H04W 52/02* (2009.01)

(56) References Cited

U.S. PATENT DOCUMENTS

| | | | |
|---|---|---|---|
| 6,377,790 B1 | 4/2002 | Ishii | |
| 6,493,326 B1 | 12/2002 | Ramachandran | |
| 6,545,989 B1 | 4/2003 | Butler | |
| 7,039,358 B1 | 5/2006 | Shellhammer et al. | |
| 7,126,945 B2 | 10/2006 | Beach | |
| 7,916,675 B2 | 3/2011 | Dalsgaard et al. | |
| 7,941,626 B2 | 5/2011 | Marinier et al. | |
| 8,077,647 B2 | 12/2011 | Wentink | |
| 8,094,595 B2 | 1/2012 | Montojo et al. | |
| 8,098,635 B2 | 1/2012 | Montojo et al. | |
| 8,254,977 B2 | 8/2012 | Fernandez-Corbaton et al. | |
| 8,255,708 B1 | 8/2012 | Zhang | |
| 8,792,407 B2 | 7/2014 | Hu et al. | |
| 8,797,911 B2 | 8/2014 | He et al. | |
| 2001/0015963 A1 | 8/2001 | Tuomainen et al. | |
| 2003/0152049 A1 | 8/2003 | Turner | |
| 2003/0235171 A1 | 12/2003 | Lundstrom et al. | |
| 2004/0017792 A1 | 1/2004 | Khaleghi et al. | |
| 2004/0039985 A1 | 2/2004 | Mikkola et al. | |
| 2005/0009578 A1 | 1/2005 | Liu | |
| 2005/0094816 A1* | 5/2005 | Lindoff et al. | 380/268 |
| 2005/0237984 A1 | 10/2005 | Benveniste | |
| 2006/0105717 A1 | 5/2006 | Kwon et al. | |
| 2006/0183497 A1* | 8/2006 | Paranchych et al. | 455/522 |
| 2006/0205396 A1 | 9/2006 | Laroia et al. | |
| 2007/0015529 A1* | 1/2007 | Choi et al. | 455/522 |
| 2007/0127403 A1 | 6/2007 | Lu et al. | |
| 2007/0173279 A1 | 7/2007 | Kuroda et al. | |
| 2007/0195723 A1 | 8/2007 | Attar et al. | |
| 2007/0263655 A1 | 11/2007 | Esteves et al. | |
| 2008/0095071 A1* | 4/2008 | Lu et al. | 370/254 |
| 2009/0005127 A1 | 1/2009 | Frenger et al. | |
| 2009/0092069 A1 | 4/2009 | Rhee | |
| 2009/0180414 A1 | 7/2009 | Maeda et al. | |
| 2009/0247094 A1 | 10/2009 | Sakoda | |
| 2009/0312060 A1 | 12/2009 | Bloebaum et al. | |
| 2010/0118698 A1 | 5/2010 | Yokobori et al. | |
| 2010/0202393 A1 | 8/2010 | Zhang et al. | |
| 2010/0208639 A1 | 8/2010 | Jou et al. | |
| 2010/0214942 A1 | 8/2010 | Du et al. | |
| 2010/0323683 A1 | 12/2010 | Kazmi et al. | |
| 2011/0044221 A1 | 2/2011 | Proctor, Jr. | |
| 2011/0069649 A1 | 3/2011 | Gobriel et al. | |
| 2011/0072285 A1 | 3/2011 | Fischer et al. | |
| 2011/0103301 A1 | 5/2011 | Mueck et al. | |
| 2011/0116427 A1 | 5/2011 | Chang et al. | |
| 2011/0158142 A1 | 6/2011 | Gong et al. | |
| 2011/0170420 A1 | 7/2011 | Xi et al. | |
| 2011/0299426 A1 | 12/2011 | Kumar | |
| 2011/0319064 A1 | 12/2011 | Lenart et al. | |
| 2011/0319072 A1* | 12/2011 | Ekici et al. | 455/426.1 |
| 2012/0026939 A1 | 2/2012 | Sindhushayana et al. | |
| 2012/0082079 A1 | 4/2012 | Luo et al. | |
| 2012/0082192 A1* | 4/2012 | Pelletier et al. | 375/219 |
| 2012/0239956 A1 | 9/2012 | Kwon et al. | |
| 2013/0028092 A1 | 1/2013 | Tong et al. | |
| 2013/0107774 A1 | 5/2013 | Wang et al. | |
| 2013/0107780 A1 | 5/2013 | Choi et al. | |
| 2013/0121172 A1 | 5/2013 | Cheng et al. | |
| 2013/0190027 A1 | 7/2013 | Cao et al. | |
| 2013/0201893 A1 | 8/2013 | Hu et al. | |
| 2013/0205155 A1 | 8/2013 | Yang et al. | |
| 2013/0215788 A1 | 8/2013 | He et al. | |
| 2013/0215812 A1 | 8/2013 | Hu et al. | |
| 2013/0250832 A1 | 9/2013 | Kim et al. | |
| 2013/0316761 A1* | 11/2013 | Ekici et al. | 455/552.1 |
| 2014/0135022 A1* | 5/2014 | Frenger et al. | 455/437 |
| 2014/0226550 A1 | 8/2014 | He et al. | |
| 2014/0247761 A1 | 9/2014 | Hu et al. | |
| 2014/0254452 A1 | 9/2014 | Golitschek et al. | |
| 2015/0055528 A1 | 2/2015 | Sun et al. | |

FOREIGN PATENT DOCUMENTS

| | | | |
|---|---|---|---|
| EP | 2320692 A1 | 5/2011 | |
| EP | 2398285 A1 | 12/2011 | |
| GB | 2493713 A | 2/2013 | |
| WO | 2007025138 A2 | 3/2007 | |
| WO | WO-2007148198 A2 | 12/2007 | |

OTHER PUBLICATIONS

Article 34—Chapter II Demand; Competent IPEA: EP; filed May 2, 2014 PCT/US2013/063281.

Written Opinion of the International Preliminary Examining Authority; International Preliminary Examining Authority; Sep. 26, 2014; PCT/US2013/063281.

Notification of Transmittal of the International Preliminary Report on Patentability; International Preliminary Examining Authority; Dec. 15, 2014; PCT/US2013/063281.

Rashid Attar QUALLCOMM Incorporated (858) 651-1553 RAT-TARTHETAUALCOMM COM: "Battery life Improvements for 1xEVDO Revision A terminals", 3GPP2 Draft; C30—20050516 053_QCOM_T_Terminal_Battery_Life_Improvement, 3RD Generation Partnership Project 2, 3GPP2, 2500 Wilson Boulevard, Suite 300, Arlington, Virginia 22201; USA, vol. TSGC May 20, 2005, pp. 1-7, XP062155768, Retrieved from the Internet: URL:http://ftp.3gpp2.org/TSGC/Working/2005/2005-05 Portland/TSGC—2005-05-Portland/WG3/[retrieved on May 20, 2005].

* cited by examiner

DEVICES AND METHODS FOR FACILITATING DISCONTINUOUS TRANSMISSION ON ACCESS TERMINALS

PRIORITY CLAIM AND REFERENCE TO RELATED CASES

The present application for patent claims priority to Provisional Application No. 61/712,773 entitled "Wireless Communication Device Power Reduction Method and Apparatus" filed Oct. 11, 2012, and assigned to the assignee hereof and hereby expressly incorporated in its entirety as if fully set forth below for all applicable purposes. The present application for patent is also related to the following co-pending U.S. patent application Ser. Nos. 13/401,122 and 13/401,143, both filed 21 Feb. 2012, and both expressly incorporated in their entireties as if both are fully set forth below and for all applicable purposes.

TECHNICAL FIELD

The technology discussed below relates generally to wireless communications, and more specifically, to methods and devices for facilitating discontinuous transmission (DTX) for access terminals operating in a wireless communications system.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. Such devices may be generally referred to as access terminals. Access terminals adapted to access one or more wireless communications systems are becoming increasingly popular, with consumers often using power-intensive applications that run on the access terminals. Access terminals are typically powered by a limited power source (e.g., rechargeable battery) and, consequently, may operate in various modes to assist in extending the operating life of the access terminal between charges. For a given battery capacity, the rate and amount of power consumption determines how much the access terminal can operate without recharging. Another way of looking at power consumption is that for a given amount of operating time between battery recharges, average power consumption dictates the required battery capacity and, consequently, the size, weight, and cost of the battery. Reducing the power consumption of an access terminal can result in lower battery requirements and can save costs. Features which may assist in extending the operating life of the access terminal between recharging are therefore beneficial.

BRIEF SUMMARY OF SOME EXAMPLES

Various examples and implementations of the present disclosure facilitate discontinuous transmission modes on access terminals operating in a wireless communications system. According to at least one aspect of the present disclosure, access terminals may include a communications interface and a storage medium each coupled with a processing circuit. The processing circuit may be adapted to employ a short timescale discontinuous transmission (DTX) mode and a long timescale DTX mode, where the short timescale DTX mode and the long timescale DTX mode are employed independently of each other.

Further aspects of the present disclosure provide methods operational on an access terminal and/or access terminals including means to perform such methods. One or more examples of such methods may include determining whether a first set of predetermined factors are present. A short timescale DTX mode may be enabled when the first set of predetermined factors are determined to be present, where the short timescale DTX mode is enabled independent of a long timescale DTX mode. A determination may also be made regarding whether a second set of predetermined factors are present. The long timescale DTX mode may be enabled when the second set of predetermined factors are determined to be present, where the long timescale DTX mode is enabled independent of the short timescale DTX mode.

Still further aspects include computer-readable storage mediums comprising programming operational on a computer, such as a wireless communications device. According to one or more examples, such programming may be adapted for causing a computer to determine whether a first set of predetermined factors are present, and enable a short timescale DTX mode when the first set of predetermined factors are determined to be present. The programming may also be adapted to cause a computer to determine whether a second set of predetermined factors are present, and enable the long timescale DTX mode when the second set of predetermined factors are determined to be present, where the short timescale DTX mode and the long timescale DTX mode are enabled independent of each other.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for CDMA Evolution-Data Optimized (EV-DO) protocols and systems, and related terminology may be found in much of the following description. However, those of ordinary skill in the art will recognize that one or more aspects of the present disclosure may be employed and included in one or more other wireless communication protocols and systems.

EV-DO is a wireless telecommunications standard used for transmission of data for broadband Internet access. EV-DO uses code division multiple access (CDMA), as well as time division multiplexing (TDM) to maximize individual user throughput and overall system throughput. EV-DO represents an evolution of the CDMA (IS-2000) standard supporting increased data rates and are optimized for data transmission. EV-DO is typically deployed together with voice services. In such a system, voice may be transmitted as data, for example, in voice over internet protocol (VoIP) transmissions.

One type of EV-DO is commonly referred to as 1xEV-DO. 1xEV-DO includes Revision 0, Revision A, and Revision B, each of which provide benefits over previous versions of EV-DO. Capacity and quality of service (QoS), for example, are improved in 1xEV-DO Revision A. Revision B allows multi-carrier device operation.

Figure 1:
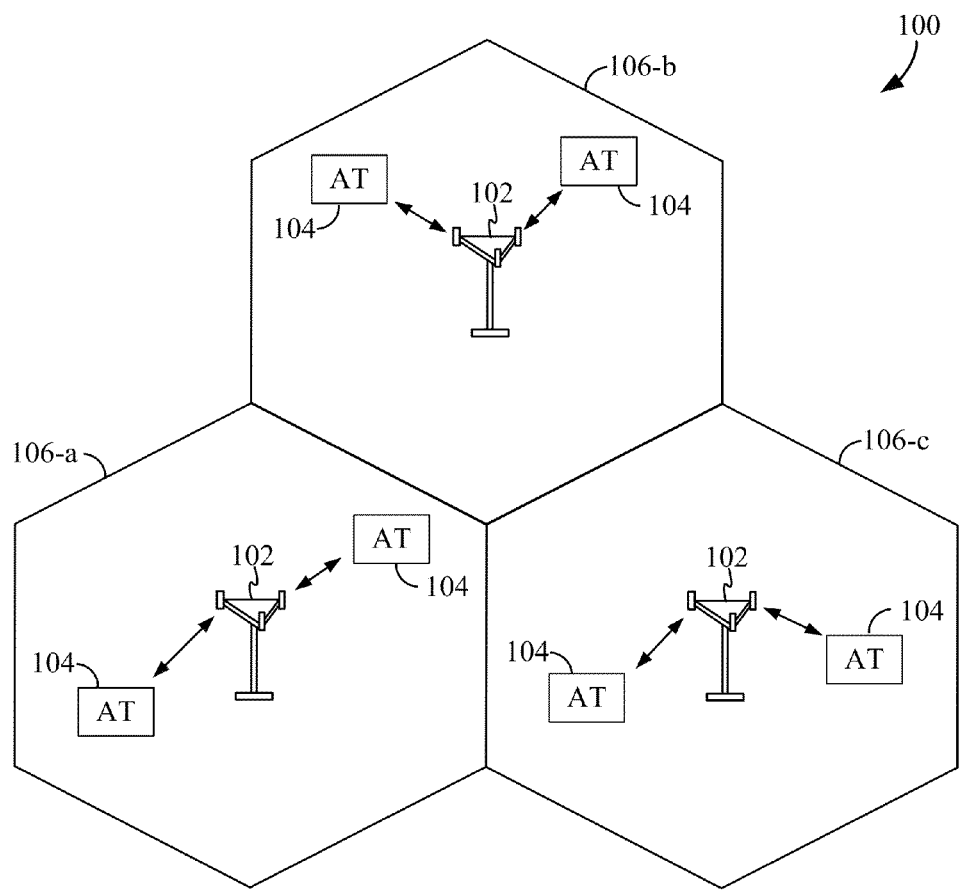
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
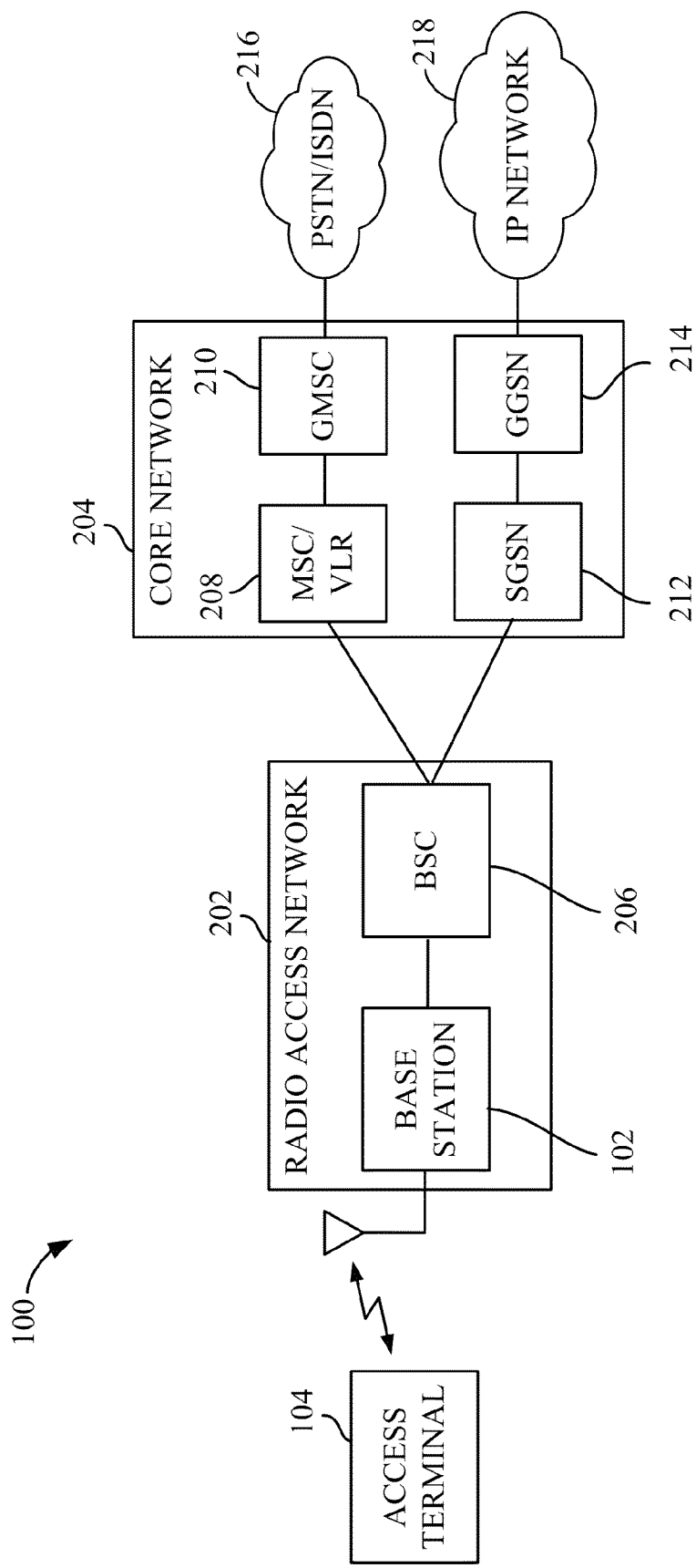
FIG. 2 is a block diagram illustrating select components of the wireless communication system of FIG. 1 according to at least one example.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

The wireless communications system 100 may employ data-optimized architecture and/or protocols, such as a 1xEV-DO network. As an access terminal 104 operates within such a system 100, the access terminal 104 may employ various modes of operation, including a traffic mode (or traffic state) and a dormant mode (or dormant state). In traffic mode, the wireless communications system 100 allocates air link resources for communication between the access terminal 104 and the base station 102. In dormant mode, the traffic channel is torn down, and air link resources are powered OFF at the access terminal 104. Power required to operate these resources is consequently conserved during the dormant mode, thus extending battery life at the access terminal 104. Other subsystems of the access terminal 104 may also be powered OFF or put into a "power save" mode for most of the time during the dormant mode. The access terminal 104 may occasionally "wake up" to monitor control channels, such as a paging channel (PCH) for paging messages. Such paging messages may include messages that alert the access terminal 104 to the occurrence of an incoming voice or data call and control/overhead messages that carry system information and other information for the access terminal 104.

An access terminal 104 may transition from a dormant state to traffic state in response to a voice call or data communication. The voice call or the data communication may be incoming (to the access terminal 104) or outgoing (from the access terminal 104). Conversely, the access terminal 104 may transition from the traffic state to the dormant state when traffic activity ceases for some predetermined period of time. Typically, the radio network controls the transitions between the two states.

As an access terminal 104 operates within the wireless communications system 100, traffic activity may be quite asymmetrical between the base station 102 and the access terminal 104. In other words, considerably more traffic may be communicated in one direction than in the opposite direction. This is particularly so for data communication, when downlink traffic flow typically exceeds uplink traffic flow by a large margin. For example, a user at an access terminal 104 may be downloading a large file for a relatively long period of time, with mostly control information being communicated on the uplink. The control information may be from various layers, for example, Internet Protocol (IP) acknowledgements, and power control, rate control, and pilot of the physical air link. Another example of asymmetrical traffic is internet browsing where a gap occurs between user clicks and gaps between objects downloaded in one page originating from a single web page click. Similarly, internet audio/radio and video streaming encounter periods of inactivity while data is downloading. During such time periods, uplink resources of the access terminal 104 typically remain powered ON and consequently consuming power, although they are not needed to transmit user (payload) data from the access terminal 104 to the base station 102.

In some instances, an access terminal 104 may be adapted to employ discontinuous transmission, also referred to as DTX, in which uplink transmissions are sent on the air interface only when data (e.g., speech or other data) is available for transmission by the access terminal 104. In conventional access terminals, DTX is controlled by the wireless communications system 100, such that the system 100 indicates to the access terminal whether or not to employ DTX. In some instances, however, it is beneficial to both power consumption and network interference to enable an access terminal to employ DTX independently from the wireless communications system 100.

According to at least one aspect of the present disclosure, access terminals 104 are adapted to employ a plurality of independent DTX modes. For instance, an access terminal of the present disclosure may employ a short timescale DTX and a long timescale DTX, which are enabled independent of each other. Such multiple independent DTX modes can improve power consumption of an access terminal, as well as reduce network interference.

Figure 3:
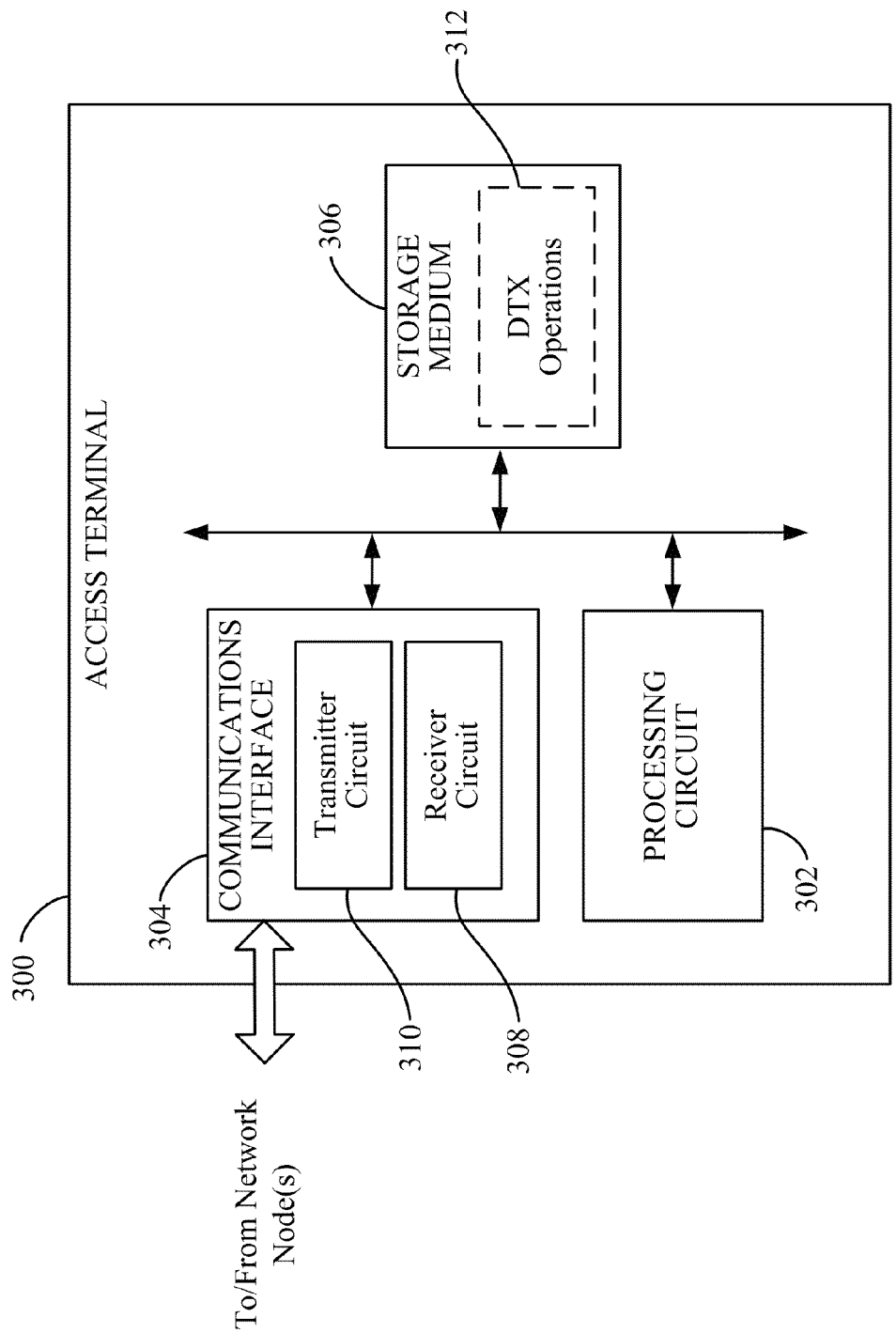
FIG. 3 is a block diagram illustrating select components of an access terminal according to at least one example.

Turning to FIG. 3, a block diagram is shown illustrating select components of an access terminal 300 according to at least one example of the present disclosure. The access terminal 300 includes a processing circuit 302 coupled to or placed in electrical communication with a communications interface 304 and a storage medium 306.

The processing circuit 302 is arranged to obtain, process and/or send data, control data access and storage, issue commands, and control other desired operations. The processing circuit 302 may include circuitry adapted to implement desired programming provided by appropriate media in at least one example. For example, the processing circuit 302 may be implemented as one or more processors, one or more controllers, and/or other structure configured to execute executable programming. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 is adapted for processing, including the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 304 is configured to facilitate wireless communications of the access terminal 300. For example, the communications interface 304 may include circuitry and/or programming adapted to facilitate the communication of information bi-directionally with respect to one or more wireless network devices (e.g., network nodes). The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains). By way of example and not limitation, the transmitter circuit 310 may include a power amplifier, filter banks and other transmitter chain components.

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming. By way of example and not limitation, the storage medium 306 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the access terminal 300, external to the access terminal 300, distributed across multiple entities).

Programming stored by the storage medium 306, when executed by the processing circuit 302, causes the processing circuit 302 to perform one or more of the various functions and/or process steps described herein. For example, the storage medium 306 may include discontinuous transmission (DTX) operations 312. The DTX operations 312 are adapted to cause the processing circuit 302 to employ and manage two or more independent DTX modes, as described herein. Thus, according to one or more aspects of the present disclosure, the processing circuit 302 is adapted to perform (in conjunction with the storage medium 306) any or all of the processes, functions, steps and/or routines for any or all of the access terminals described herein (e.g., access terminal 104, access terminal 300). As used herein, the term "adapted" in relation to the processing circuit 302 may refer to the processing circuit 302 being one or more of configured, employed, implemented, and/or programmed (in conjunction with the storage medium 306) to perform a particular process, function, step and/or routine according to various features described herein.

In operation, the access terminal 300 (e.g., the processing circuit 302 employing the DTX operations 312) can employ at least two independent DTX modes, such as a short timescale DTX and a long timescale DTX. The short timescale DTX may also be referred to as a device-only DTX, and the long timescale DTX may also be referred to as FlexConnect DTX. Because the DTX modes are independent, the access terminal 300 may employ independent factors for determining whether to enable each DTX mode.

In determining whether to enable the short timescale DTX mode, the access terminal 300 may consider various factors, which may be monitored by the communication interface 304. When the access terminal 300 determines that the various factors are present, the access terminal 300 can enable the short timescale DTX mode, independent of whether the long timescale DTX mode is enabled or not. In some multi-carrier operation, short timescale DTX enabling/disabling decisions can be jointly made, such as when the various factors are met on each carrier.

Figure 4:
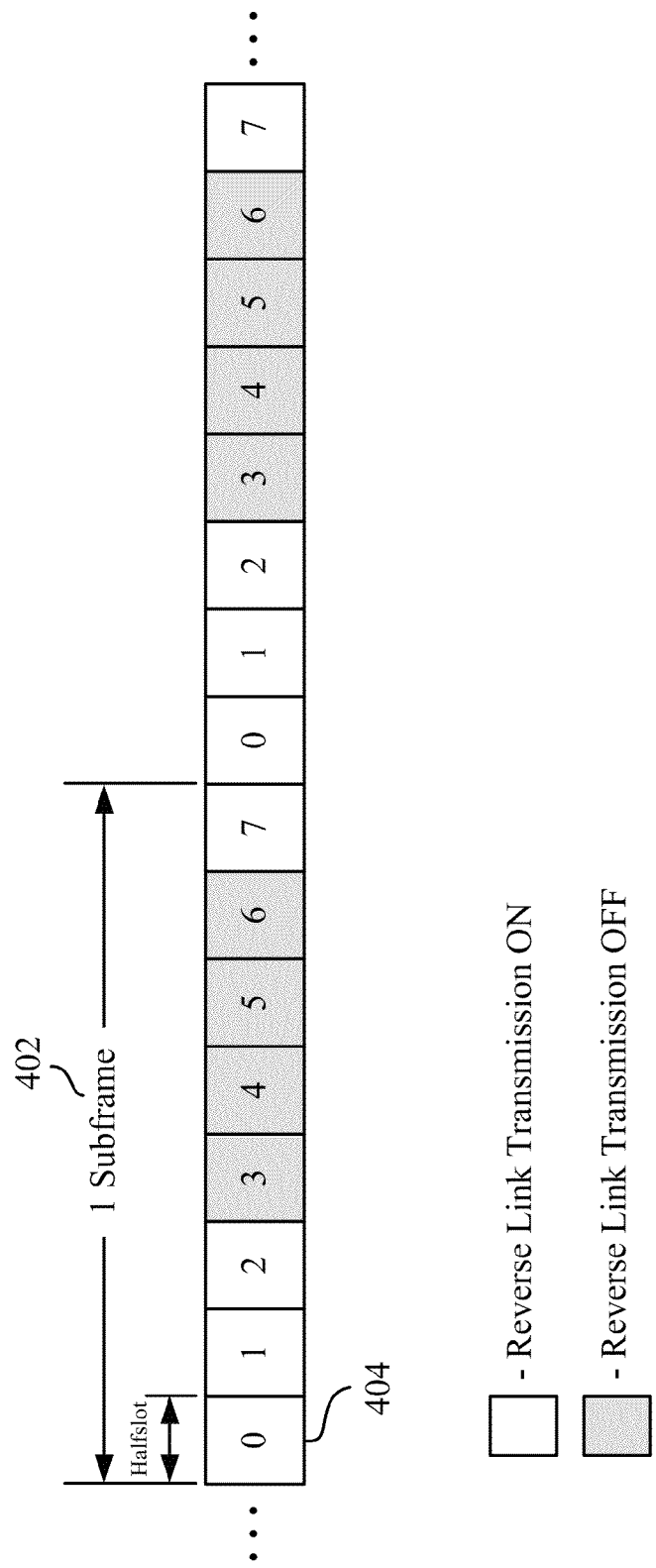
FIG. 4 is a block diagram of two uplink subframes illustrating an example of a short timescale DTX mode according to at least one embodiment.

When the access terminal 300 identifies all relevant factors are present, the short timescale DTX mode may be enabled. FIG. 4 is a block diagram of two uplink subframes illustrating an example of a short timescale DTX mode according to at least one embodiment. Generally speaking, 1xEV-DO employs frames that are each 26⅔ milliseconds long. Each 1xEV-DO frame is divided into sixteen equal periods called "slots" or "timeslots." The access terminal 300 generally transmits sub-packets occupying four reverse link slots, where the four reverse link slots are called a reverse link "subframe." As shown in FIG. 4, a subframe 402, therefore, includes eight halfslots 404, numbered 0 through 7.

When a short timescale DTX mode is enabled by the access terminal 300, communication between the access terminal 300 and one or more network entities (e.g., a base station) can be carried out as shown in the example depicted in FIG. 4. As illustrated, the access terminal 300 is adapted to carry out communication monitoring according to an alternating ON and OFF pattern (e.g., a two slots ON, two slots OFF arrangement). In this example, the access terminal 300 can power ON the transmitter circuit 304 for two slots (four halfslots) and then power OFF one or more components of the transmitter circuit 304 for two slots (four halfslots). In the specific example illustrated in FIG. 4, the transmitter circuit 304 can be powered ON for reverse link transmission during halfslots 0, 1, and 2 of the first subframe, followed by halfslots 3, 4, 5, and 6 where at least a portion of the transmitter circuit 304 can be powered OFF for reverse link transmissions, followed by powering ON the transmitter circuit 304 for halfslots 7 of the first subframe, and 0, 1, and 2 of the next subframe, etc. Although the example in FIG. 4 illustrates one possible implementation of the short timescale DTX mode, it will be apparent that other variations are also possible including variations in the durations of ON and OFF periods and/or the particular locations of ON and OFF periods within each subframe.

The access terminal 300 typically communicates with a group of cells at any given time. This group of cells is conventionally referred to as an active set (ASET). The access terminal 300 can typically determine whether one or more of the cells in the active set is employing a particular chipset, such as a CSM6800 or CSM6850 chipset. The detection of CSM6800 versus CSM6850 can be performed by the access terminal 300 based on certain fields in received signaling messages. Depending on whether the active set includes purely CSM6800 sectors, purely CSM6850 sectors, or a combination of both types, the access terminal 300 may be adapted to shift the different positions of ON and OFF in the short timescale DTX mode. This shift may be referred to as DTX Frame Offset, and may depend on the original network-assigned frame offset, referred to as Frame Offset. The Frame Offset assigned by the network can generally take any value between 0 and 15.

When the short timescale DTX mode is enabled and the active set includes either purely CSM6800 sectors or a mix of CSM6800 and CSM6850 sectors (e.g., not purely CSM6850 sectors), the DTX Frame Offset can replace the Frame Offset for the DTX pattern. For example, the DTX Frame Offset can be equal to the Frame Offset modulo 2 in some scenarios.

Figure 5:
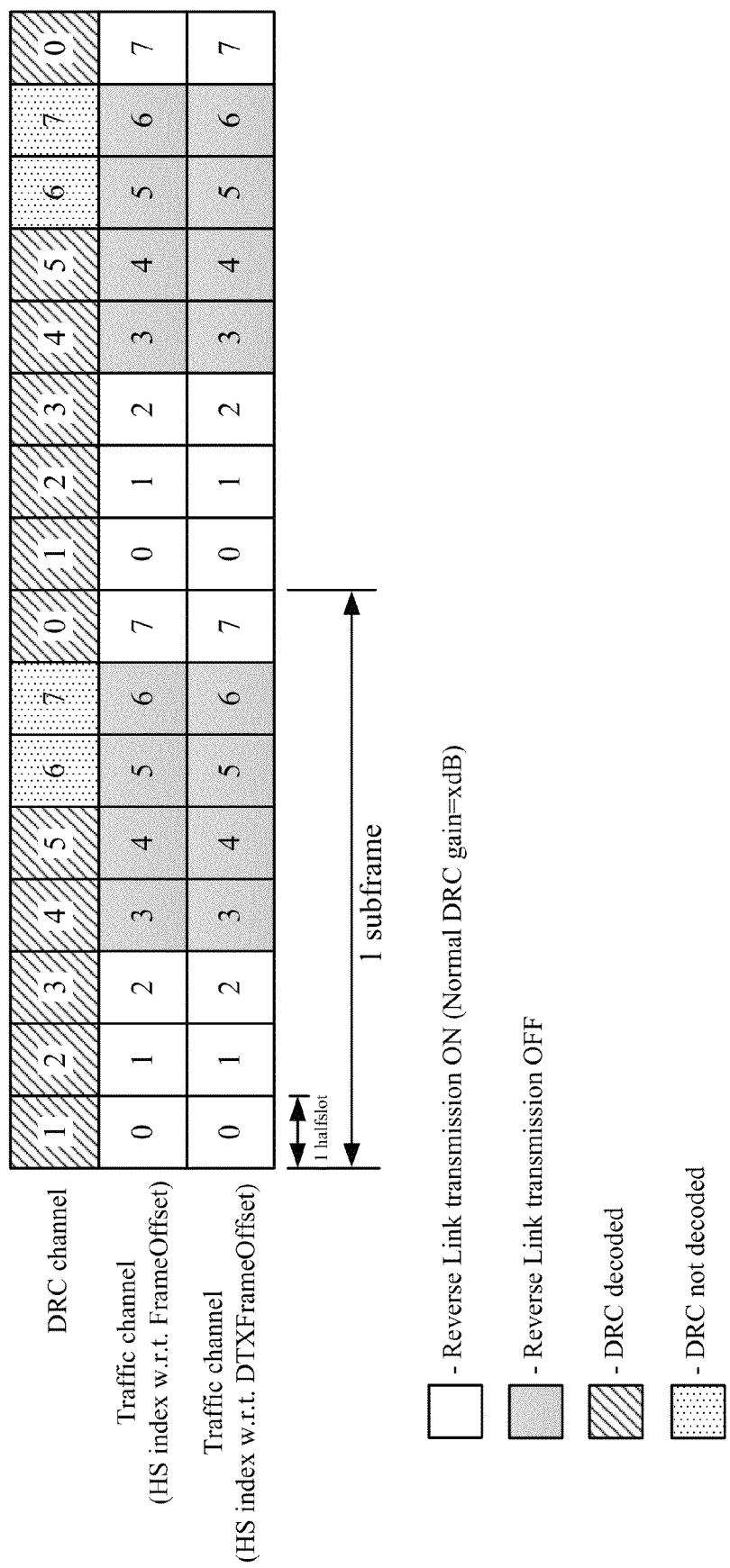
FIG. 5 is a block diagram illustrating DRC decoding according to at least one example of a short timescale DTX mode.

Turning to FIG. 5, a block diagram is shown illustrating DRC decoding in an example where the DTX pattern is the same as that shown in FIG. 4, and where the length of the data rate control field (DRC Length) is equal to four slots (e.g., eight halfslots numbered 1 through 7). In this example, both the Frame Offset and the DTX Frame Offset are equal to zero. As illustrated, the DRC channel can be successfully decoded on the first three slots (e.g., halfslots 1, 2, 3, 4, and 5). The last slot (e.g., halfslots 6 and 7) is not decoded.

Figure 6:
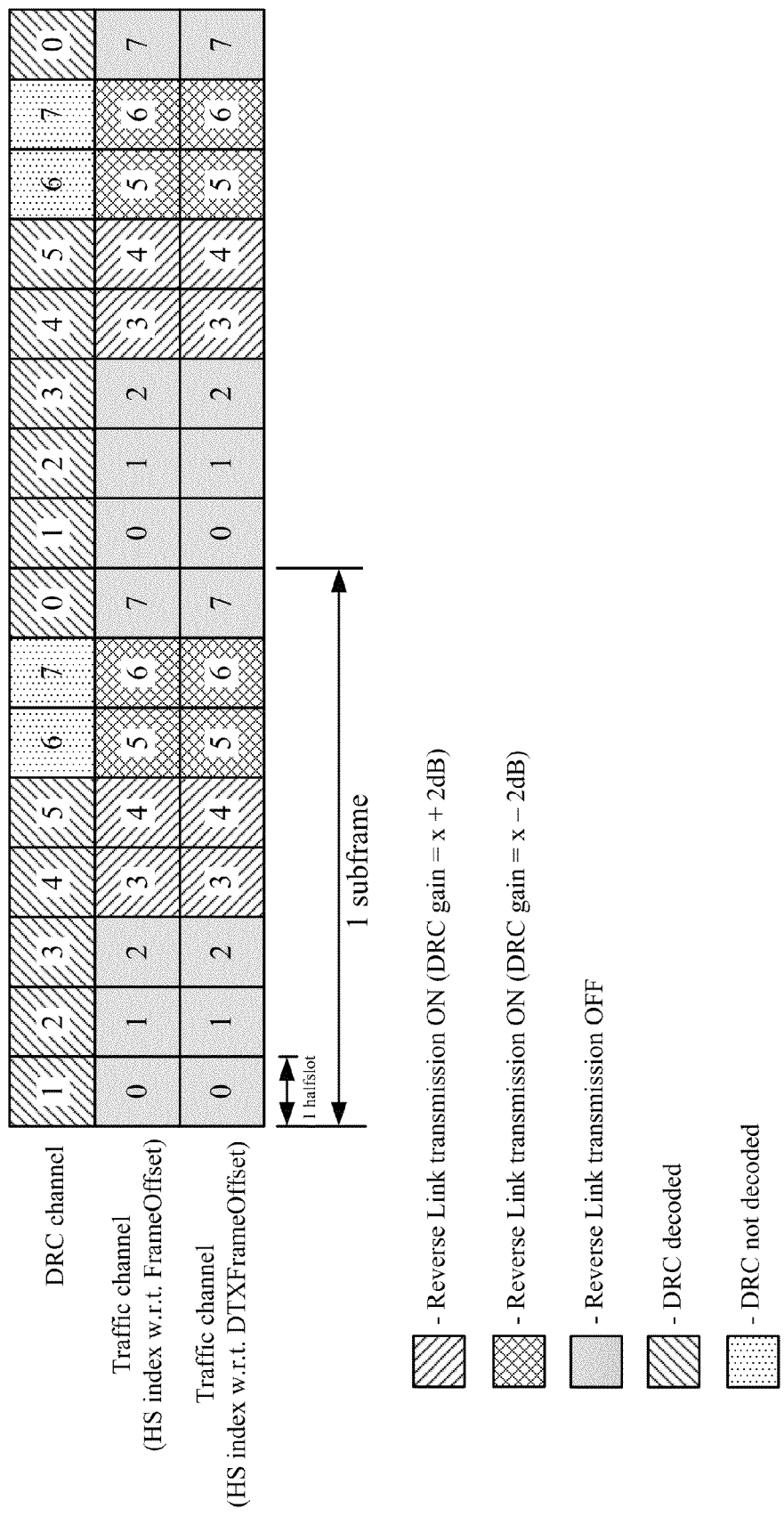
FIG. 6 is a block diagram illustrating DRC decoding according to at least one other example of a short timescale DTX mode.

Further, if the active set for the access terminal 300 is not exclusively CSM6850 sectors, and where the DRC Length is equal to four slots, and the Frame Offset modulo 4 is either 2 or 3, then the DRC channel gain may be boosted on two of the halfslots, de-boosted on another two of the halfslots, and normal for the rest of the halfslots for each subframe. Turning to FIG. 6, a block diagram is depicted illustrating the DRC channel gains when the Frame Offset is equal to two and the DTX Frame Offset is equal to zero. In this example, the DRC channel gain is boosted on halfslots 3 and 4 of the traffic channels, and deboosted on halfslots 5 and 6 of the traffic channels.

For the long timescale DTX mode, the access terminal 300 may also consider various factors when determining whether to enable the long timescale DTX mode. These factors may be monitored by the communications interface 304. When the access terminal 300 determines that the various factors are present, the access terminal 300 can enable the long timescale DTX mode, independent of whether the short timescale DTX mode is enabled or not.

Figure 7:
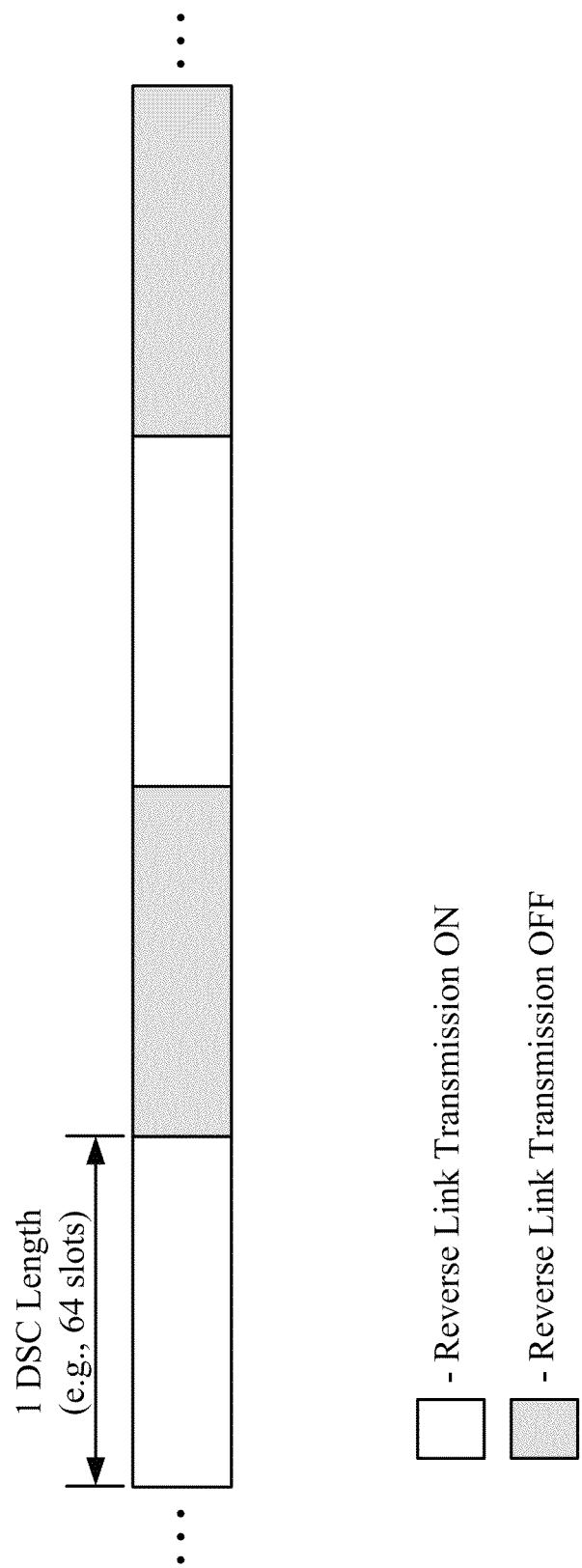
FIG. 7 is a block diagram illustrating an example of a long timescale DTX mode according to at least one embodiment.

When the long timescale DTX mode is enabled by the access terminal 300, communication between the access terminal 300 and one or more network entities (e.g., a base station) can be carried out as shown in the example depicted in FIG. 7. As illustrated, the access terminal 300 is adapted to employ a periodic ON and OFF pattern. In the depicted example, this periodic ON and OFF pattern is aligned with the DRCLock boundary and the duration of the ON period can correspond to the DSC Length. The DSC Length refers to the number of slots the DSC channel is transmitted for. In this example, the DSC Length can be 64 slots in duration and the ON and OFF periods are of equal duration. Accordingly, the access terminal 300 operating with the long timescale DTX mode enabled can power ON the transmitter circuit 304 for 64 slots, and power OFF the transmitter circuit 304 for 64 slots. Although the example in FIG. 7 illustrates one possible implementation of the long timescale DTX mode, it will be apparent that other variations are also possible including variations in the durations of ON and OFF periods.

During the reverse link ON periods, the access terminal 300 can operate in a manner generally similar to a conventional disabled state. During the OFF periods, the access terminal 300 may power OFF one or more components of the transmitter circuit 304, such as the filter banks and/or the power amplifier. In addition, the access terminal 300 may be adapted to freeze close loop power control, wherein the access terminal 300 may avoid responding to any received closed-loop power control commands from the network. Further, the access terminal 300 may zero out digital gains during the OFF periods.

When operating in the long timescale DTX mode, the DRCLock bit may be handled differently than when the long timescale DTX mode is not enabled. For instance, the DRCLock decisions that are based on DRC channel reception may be skipped during OFF periods of the long timescale DTX mode. That is, when the access terminal 300 is in the OFF state for some period of time (e.g., 64 slots), a DRCLock bit having a value of "unlocked" may arrive. This received DRCLock bit, however, would not be based on channel measurements, and accordingly would not be valid. As a result, the access terminal 300 may be adapted to skip these decisions.

As has been noted above, the access terminal 300 is adapted to employ the various DTX modes independently. As a result, it may occur that two or more DTX modes are enabled at the same time. That is, the access terminal 300 can enable two or more DTX modes simultaneously, instead of selecting only one at a time. Each DTX mode may be enabled independently of each other when the particular factors are satisfied for the associated DTX mode. Similarly, each DTX mode can be disabled independently of each other when one or more of the particular factors are not satisfied for the associated DTX mode.

Figure 8:
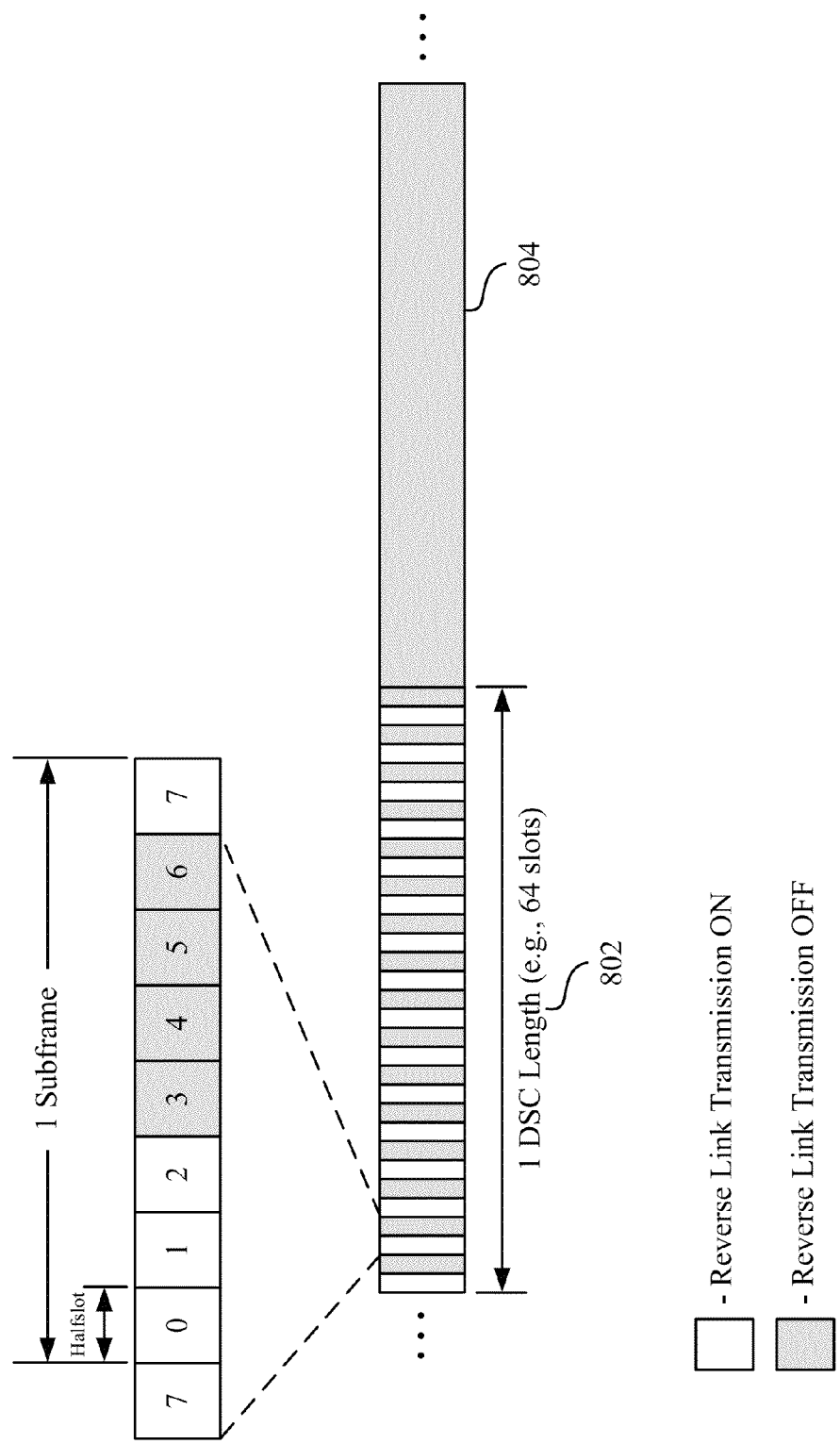
FIG. 8 is a block diagram illustrating an example of both short timescale DTX mode and long timescale DTX mode being enabled, according to at least one embodiment.

When the short timescale DTX mode and the long timescale DTX mode are both enabled by the access terminal 300, communication between the access terminal 300 and one or more network entities (e.g., a base station) can be carried out as shown in the example depicted in FIG. 8. As shown, the long timescale DTX mode is ON for one DSC Length 802 (e.g., 64 slots) and then OFF for a similar duration 804. During the ON period 802 of long timescale DTX mode, the short timescale DTX mode is also enabled with a shorter cycle of ON and OFF periods. As a result the ON period 802 of the long timescale DTX mode is actually a plurality of alternating ON and OFF periods according to the short timescale DTX mode, followed by an OFF period of the long timescale DTX mode. In other words, the illustrated example includes a first DSC Length 802 made up of an alternating pattern of reverse transmissions being 2 slots ON and 2 slots OFF, followed by a second DSC Length 804 made up of reverse link transmissions fully OFF.

Figure 9:
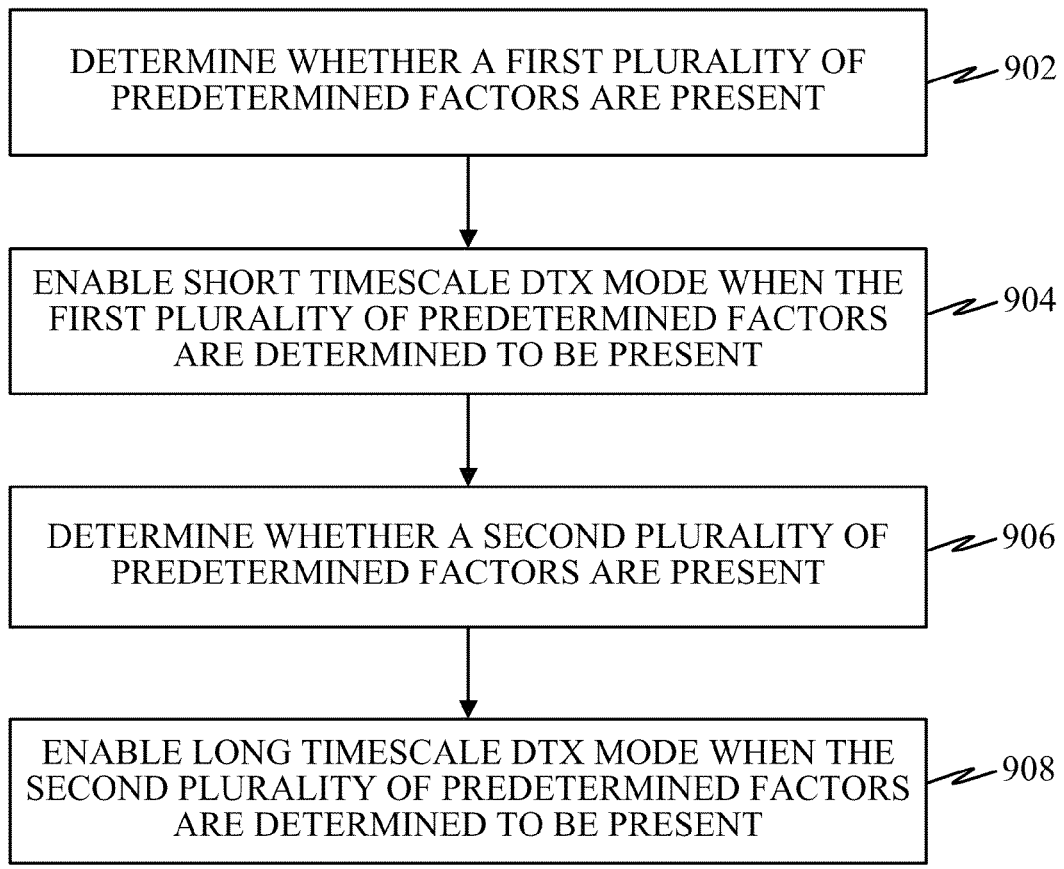
FIG. 9 is a flow diagram illustrating at least one example of a method operational on an access terminal.

FIG. 9 is a flow diagram illustrating at least one example of a method operational on an access terminal, such as the access terminal 300. Referring to FIGS. 3 and 9, an access terminal 300 can determine whether a first set of predetermined factors are present at step 902. For example, the processing circuit 302 executing the DTX operations 312 may determine whether one or more predetermined factors of a first group of factors are present.

At step 904, the access terminal 300 can enable a short timescale DTX mode when one or more factors of the first set are present. In at least one example, the processing circuit 302 executing the DTX operations 312 may enable the short timescale DTX mode at the access terminal 300. In at least one example, the short timescale DTX mode may be enabled to operate in a manner similar to one or more of the examples described above with reference to FIGS. 4 through 6.

Figure 10:
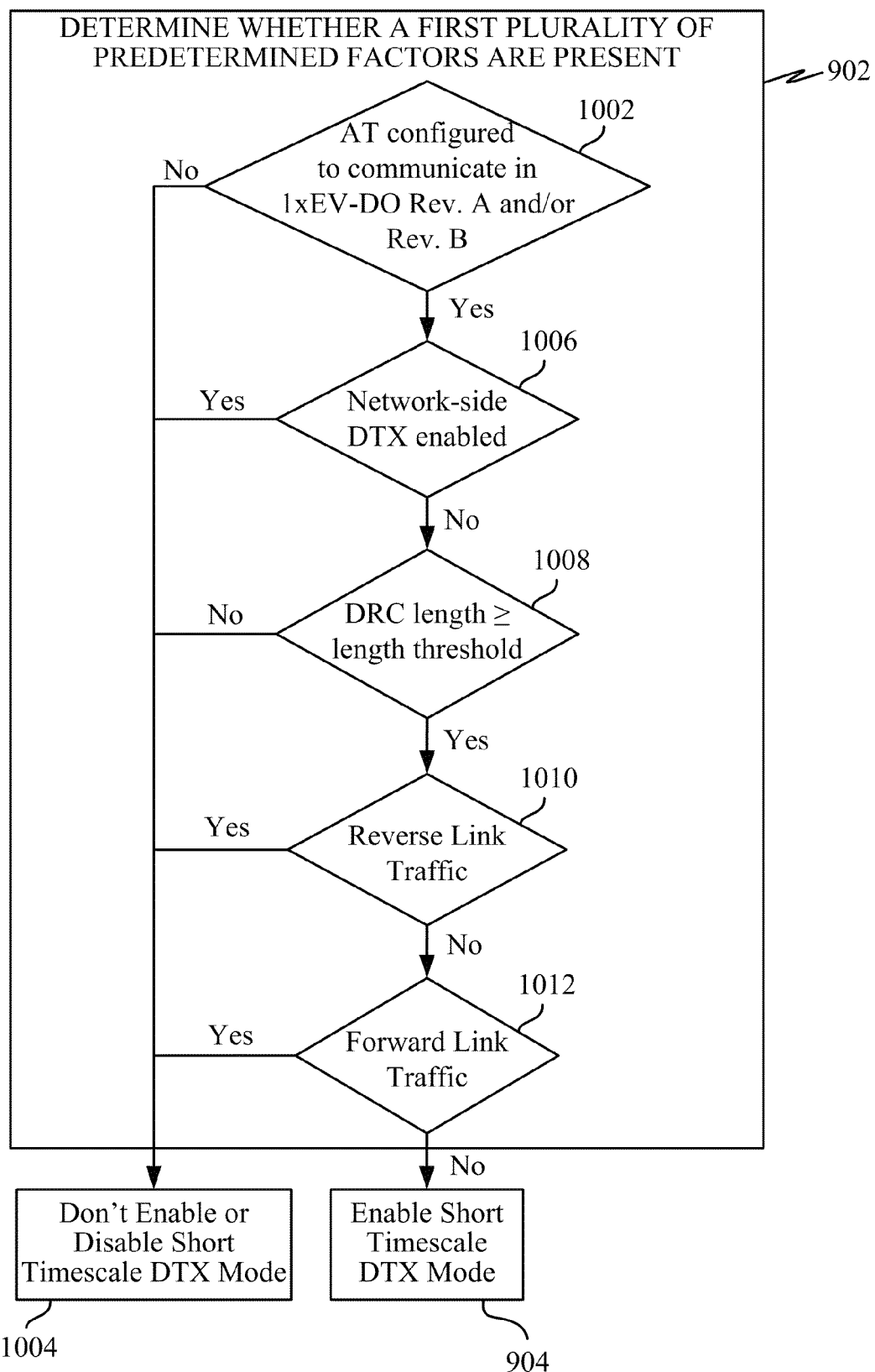
FIG. 10 is a flow diagram illustrating a method of determining whether the first set of predetermined factors are present.

FIG. 10 is a flow diagram illustrating a method of determining whether the first set of predetermined factors are present at step 902. According to various examples, the processing circuit 302 may be adapted to determine whether just one factors is present, whether some combination of two or more factors are present, or whether all of the factors are present.

As depicted in FIG. 10, the processing circuit 302 executing the DTX operations 312 may determine at step 1002 whether the access terminal 300 is capable and/or is actively operating in communicating in either Rev. A or Rev. B forms of 1xEV-DO, or both. If the processing circuit 302 executing the DTX operations 312 determines that the access terminal 300 is not capable of, or is not actively communicating in at least one of these forms of 1xEV-DO, the processing circuit 302 executing the DTX operations 312 may go to step 1004 and prevent the access terminal 300 from enabling the short timescale DTX mode.

At 1006, the processing circuit 302 executing the DTX operations 312 may determine whether DTX have been enabled on the access terminal 300 by the network (e.g., network-side DTX is not enabled). As noted above, network-side DTX is a conventional and standardized DTX operation. By determining that network-side DTX is not enabled, the access terminal 300 can ensure that the short timescale DTX mode will not interfere with network DTX operations. If the processing circuit 302 executing the DTX operations 312 determines that network-side DTX has been enabled, then the processing circuit 302 executing the DTX operations 312 can either prevent short timescale DTX mode from being enabled, or disable the short timescale DTX mode at 1004.

At 1008, the processing circuit 302 executing the DTX operations 312 may determine whether the length of the data rate control field (DRC Length) is equal to, or greater than a certain predetermined threshold. In at least one example, the predetermined threshold may be four slots, such that the access terminal 300 determines whether the length of the DRC field is greater than or equal to four slots. The DRC generally has a certain length, wherein it transmits the same information over several slots. To avoid or eliminate a total loss of the DRC information, the access terminal 300 can enable (or trigger) the short timescale DTX when the DRC Length is above a certain threshold number of slots. If the processing circuit 302 executing the DTX operations 312 determines that the DRC Length is not greater than or equal to the particular threshold, then the processing circuit 302 executing the DTX operations 312 can either prevent the short timescale DTX mode from being enabled, or disable the short timescale DTX mode at 1004.

At 1010, the processing circuit 302 executing the DTX operations 312 may determine whether there is any reverse link traffic. This may include a determination whether there has been any reverse link traffic for a particular threshold duration of time. This can aid the access terminal 300 in avoiding or reducing any negative impact on reverse link transmissions when the short timescale DTX mode is enabled. If the processing circuit 302 executing the DTX operations 312 determines that there is reverse link traffic, or that there has been reverse link traffic within a predefined duration, then the processing circuit 302 executing the DTX operations 312 can either prevent the short timescale DTX mode from being enabled, or disable the short timescale DTX mode at 1004.

At 1012, the processing circuit 302 executing the DTX operations 312 may also determine whether there has been any forward link traffic for some predetermined time period. In at least one example, the predetermined time period during which there has been no forward link traffic may be about 50 milliseconds, although shorter or longer time thresholds may be utilized in various other implementations. If the processing circuit 302 executing the DTX operations 312 determines that there currently is or has been forward link traffic within the predefined duration, then the processing circuit 302 executing the DTX operations 312 can either prevent the short timescale DTX mode from being enabled, or disable the short timescale DTX mode at 1004.

If one or more of the above factors are determined according to the flow diagram in FIG. 10, then the processing circuit 302 executing the DTX operations 312 can enable the short timescale DTX mode at the access terminal 300 at step 904 depicted in both FIGS. 9 and 10.

Referring again to FIG. 9, the access terminal 300 can determine whether a second plurality of predetermined factors are present at step 906. For example, the processing circuit 302 executing the DTX operations 312 may determine whether one or more predetermined factors of a second group of factors are present.

At step 908, the access terminal 300 can enable a long timescale DTX mode when one or more factors of the first set are present. In at least one example, the processing circuit 302 executing the DTX operations 312 may enable the long timescale DTX mode at the access terminal 300. In at least one example, the long timescale DTX mode may be enabled to operate in a manner similar to the example described above with reference to FIG. 7.

Figure 11:
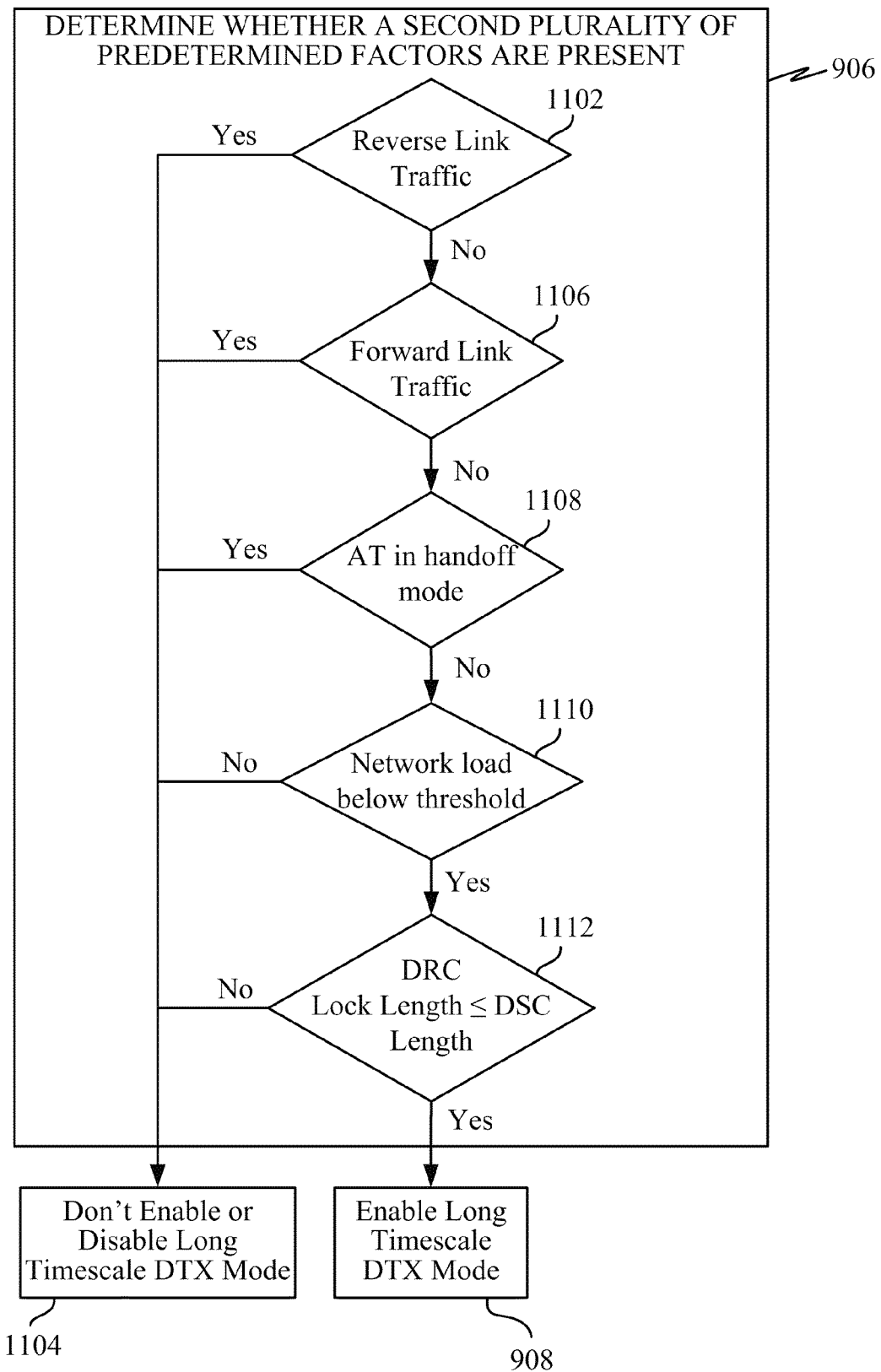
FIG. 11 is a flow diagram illustrating a method of determining whether the second set of predetermined factors are present.

FIG. 11 is a flow diagram illustrating a method of determining whether the second set of predetermined factors are present at step 906. According to various examples, the processing circuit 302 may be adapted to determine whether just one factor is present, whether some combination of two or more factors are present, or whether all of the factors are present.

As depicted in FIG. 11, the processing circuit 302 executing the DTX operations 312 may determine at step 1102 whether there is any reverse link traffic. This may include a determination whether there has been any reverse link traffic for a particular threshold duration of time. In at least one example, such a threshold may be 100 milliseconds, although shorter or longer time thresholds may be utilized in various other implementations. If the processing circuit 302 executing the DTX operations 312 determines that there is reverse link traffic, or that there has been reverse link traffic within the threshold duration, then the processing circuit 302 executing the DTX operations 312 can either prevent the long timescale DTX mode from being enabled, or disable the long timescale DTX mode at 1104.

At 1106, the processing circuit 302 executing the DTX operations 312 may also determine whether there has been any forward link traffic for some threshold period of time. In at least one example, the threshold time period during which there has been no forward link traffic may be about 100 milliseconds, although shorter or longer time thresholds may be utilized in various other implementations. If the processing circuit 302 executing the DTX operations 312 determines that there currently is or has been forward link traffic within the predefined threshold, then the processing circuit 302 executing the DTX operations 312 can either prevent the long timescale DTX mode from being enabled, or disable the long timescale DTX mode at 1104.

At 1108, the processing circuit 302 executing the DTX operations 312 may determine whether the access terminal 300 is currently in a handoff mode. That is, the processing circuit 302 executing the DTX operations 312 may verify that the access terminal 300 is not undergoing a handoff to another sector. This can reduce or eliminate the likelihood that the long timescale DTX mode will substantially hinder a handoff operation, such as by causing wasted network signaling. If the processing circuit 302 executing the DTX operations 312 determines that the access terminal 300 is in a handoff mode, then the processing circuit 302 executing the DTX operations 312 can either prevent the long timescale DTX mode from being enabled, or disable the long timescale DTX mode at 1104.

At 1110, the processing circuit 302 executing the DTX operations 312 may determine whether the network is heavily loaded. In some scenarios, the processing circuit 302 executing the DTX operations 312 may determine whether the network is heavily loaded based on a number of factors including MAC indexes and busy thresholds. For example, the processing circuit 302 executing the DTX operations 312 can determine whether a number of MAC indexes is less than or equal to a max MAC index threshold, and/or whether a filtered RL activity bit (FRAB) is less than a first busy threshold. If the processing circuit 302 executing the DTX operations 312 determines that the number of MAC indexes is less than the max MAC index threshold and/or that FRAB is less than the first busy threshold, the processing circuit 302 executing the DTX operations 312 is allowed to enable the long timescale DTX mode. In some instances, a second busy threshold may be employed to determine whether to disable the long timescale DTX mode. For example, if the processing circuit 302 executing the DTX operations 312 determines that the number of MAC indexes is greater than the max MAC index threshold and/or FRAB is greater than the second busy threshold, the processing circuit 302 executing the DTX operations 312 may disable the long timescale DTX mode at 1104.

At 1112, the processing circuit 302 executing the DTX operations 312 may determine whether the DRCLock Length and the DSC Length are in proper relationship. The DRCLock Length refers to the number of slots the DRCLock bit is transmitted for. In many instances, this DRCLock Length is about 64 slots. The DSC Length refers to the number of slots the DSC channel is transmitted for. In many instances, this DSC Length can also be about 64 slots. The processing circuit 302 executing the DTX operations 312 may avoid turning OFF the one or more components of the transmitter circuit 310 for a period longer than the DSC Length to avoid undesired issues at the base station side. The processing circuit 302 executing the DTX operations 312 may align the ON and OFF periods of the long timescale DTX mode with the DRCLock boundary (e.g., turn OFF reverse link transmissions for one DRCLock Length, then turn ON reverse link transmissions for the next DRCLock Length, etc.). If the DRCLock Length is greater than the DSC Length, it may be undesirable for the DSC to be turned OFF for more than the DSC Length. Accordingly, the processing circuit 302 executing the DTX operations 312 may prevent the long timescale DTX mode from being enabled at 1104 when the DRCLock Length is greater than the DSC Length.

In some examples, the processing circuit 302 executing the DTX operations 312 may also be configured to enable the long timescale DTX mode only after the transmitter circuit 310 has been ON for a duration of at least one DSC Length.

In addition to the factors described, the access terminal 300 may consider one or more other factors in determining whether prevent the long timescale DTX mode from being enabled. For example, there are typically instances where the transmitter circuit 310 may be powered OFF for a period of time, such as for a tune away, RLSI, a hard handoff, off-frequency search (OFS), a handoff to different sectors, etc. In such instances, the processing circuit 302 executing the DTX operations 312 may prevent the long timescale DTX mode from enabling immediately after the transmitter circuit 310 is powered back ON following one or more of these scenarios. Poor performance issues can be avoided by preventing the long timescale DTX mode from being enabled immediately after the transmitter circuit 310 is turned ON following an OFF period. Similarly, when the access terminal 300 is conducting a soft/softer handoff and changing to a new sector, the processing circuit 302 executing the DTX operations 312 may prevent the long timescale DTX mode from being enabled immediately after the handoff to avoid handoff performance degradation.

As discussed herein above, the short timescale DTX mode and the long timescale DTX mode are enabled independent of each other. As a result, one, both or neither DTX mode may be enabled at any given time according to the method described with reference to FIG. 9. When both DTX modes are enabled simultaneously, the processing circuit 302 executing the DTX operations 312 may employ the two DTX modes in a manner similar to that described above with reference to FIG. 8.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, and/or 11 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 3 may be configured to perform or employ one or more of the methods, features, parameters, and/or steps described in FIGS. 4, 5, 6, 7, 8, 9, 10, and/or 11. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
 a communications interface;
 a storage medium; and
 a processing circuit coupled to the communications interface and the storage medium, the processing circuit adapted to:
  determine that a first set of predetermined factors are present;
  employ a short timescale discontinuous transmission (DTX) mode in response to presence of the first set of predetermined factors;
  determine that a second set of predetermined factors are present; and
  employ a long timescale DTX mode in response to presence of the second set of predetermined factors;
  wherein the short timescale DTX mode and the long timescale DTX mode are employed independent of whether or not the other is also employed.

2. The access terminal of claim 1, wherein the processing circuit adapted to determine that the first set of predetermined factors are present comprises the processing circuit adapted to: determine that the access terminal is configured to communicate in at least one of revision A or revision B forms of 1xEV-DO.

3. The access terminal of claim 1, wherein the processing circuit adapted to determine that the first set of predetermined factors are present comprises the processing circuit adapted to: determine that network-side DTX has not been enabled on the access terminal.

4. The access terminal of claim 1, wherein the processing circuit adapted to determine that the first set of predetermined factors are present comprises the processing circuit adapted to: determine that a length of a data rate control (DRC) field is equal to or greater than a predetermined threshold.

5. The access terminal of claim 1, wherein the processing circuit adapted to determine that the first set of predetermined factors are present comprises the processing circuit adapted to:
 determine an absence of reverse link traffic; and
 determine an absence of forward link traffic for a duration of a predetermined threshold.

6. The access terminal of claim 1, wherein in multi-carrier operation the processing circuit is further adapted to: determine that the first set of predetermined factors are present jointly for the multiple carriers.

7. The access terminal of claim 1, wherein the processing circuit adapted to determine that the second set of predetermined factors are present comprises the processing circuit adapted to:
 determine an absence of reverse link traffic; and
 determine an absence of forward link traffic for a duration of a predetermined threshold.

8. The access terminal of claim 1, wherein the processing circuit adapted to determine that the second set of predetermined factors are present comprises the processing circuit adapted to: determine that the access terminal is not in a handoff mode.

9. The access terminal of claim 1, wherein the processing circuit adapted to determine that the second set of predetermined factors are present comprises the processing circuit adapted to: determine a network load to be below a predetermined threshold.

10. The access terminal of claim 1, wherein the processing circuit adapted to determine that the second set of predetermined factors are present comprises the processing circuit adapted to: determine that a length of a data rate control lock (DRCLock) field is less than or equal to a length of a data source control (DSC) field.

11. The access terminal of claim 1, wherein the processing circuit is further adapted to: prevent the long timescale DTX mode from being enabled for a predetermined period of time when the transmitter circuit is powered ON after being powered OFF.

12. The access terminal of claim 1, wherein the processing circuit is further adapted to: freeze a closed-loop power control when the long timescale DTX mode is enabled.

13. The access terminal of claim 1, wherein the processing circuit is further adapted to: selectively skip some data rate control (DRC) lock decisions when the long timescale DTX mode is enabled.

14. A method operational on an access terminal, comprising:
 determining whether a first set of predetermined factors are present;
 enabling a short timescale DTX mode when the first set of predetermined factors are determined to be present, wherein the short timescale DTX mode is enabled independent of whether a long timescale DTX mode is also enabled;
 determining whether a second set of predetermined factors are present; and
 enabling the long timescale DTX mode when the second set of predetermined factors are determined to be present, wherein the long timescale DTX mode is enabled independent of whether the short timescale DTX mode is also enabled.

15. The method of claim 14, wherein determining whether the first set of predetermined factors are present comprises:
 determining that the access terminal is configured to communicate in 1xEV-DO revision A, 1xEV-DO revision B, or both;
 determining that network-side DTX has not been enabled on the access terminal;
 determining that a length of a data rate control field (DRC) is equal to or greater than a predetermined threshold;
 determining an absence of reverse link traffic; and
 determining an absence of forward link traffic for a duration of a predetermined threshold.

16. The method of claim 14, wherein determining whether the second set of predetermined factors are present comprises:
 determining an absence of reverse link traffic;
 determining an absence of forward link traffic for a duration of a predetermined threshold;
 determining that the access terminal is not in a handoff mode;
 determining a current network load is below a predetermined load threshold; and
 determining that data rate control (DRC) lock length is less than or equal to a data source control (DSC) length.

17. The method of claim 14, further comprising: preventing the long timescale DTX mode from being enabled for a predetermined period of time when a transmitter circuit of the access terminal is powered ON after being powered OFF for a period of time.

18. The method of claim 14, wherein enabling the short timescale DTX mode comprises: offsetting a timing of ON and OFF periods for the short timescale DTX mode with a known frame offset.

19. The method of claim 18, wherein offsetting the timing of ON and OFF periods for the short timescale DTX mode with a known frame offset comprises:
 determining a chipset utilized by each base stations in an active set associated with the access terminal; and
 offsetting the timing of ON and OFF periods in response to the determined chipset.

20. The method of claim 18, further comprising:
 boosting a gain for a data rate control (DRC) channel on a first portion of time slots in the short timescale DTX mode;
 deboosting the gain for the DRC channel on a second portion of time slots in the short timescale DTX mode; and
 maintaining the gain for the DRC channel on remaining timeslots in the short timescale DTX mode.

21. The method of claim 14, wherein enabling the long timescale DTX mode comprises:
 aligning ON and OFF periods of the long timescale DTX mode with a data rate control (DRC) lock boundary.

22. The method of claim 14, wherein enabling the long timescale DTX mode comprises: freezing closed-loop power control during OFF periods of the long-timescale DTX mode.

23. The method of claim 14, wherein enabling the long timescale DTX mode comprises: zeroing out digital gains during OFF periods of the long-timescale DTX mode.

24. An access terminal, comprising:
 means for determining whether a first set of predetermined factors are present;
 means for enabling a short timescale DTX mode when the first set of predetermined factors are determined to be present, wherein the short timescale DTX mode is enabled independent of whether or not a long timescale DTX mode is also enabled;
 means for determining whether a second set of predetermined factors are present; and
 means for enabling the long timescale DTX mode when the second set of predetermined factors are determined to be present, wherein the long timescale DTX mode is enabled independent of whether or not the short timescale DTX mode is also enabled.

25. The access terminal of claim 24, further comprising:
 means for boosting a gain for a data rate control (DRC) channel on a first portion of time slots in the short timescale DTX mode;
 means for deboosting the gain for the DRC channel on a second portion of time slots in the short timescale DTX mode; and
 means for maintaining the gain for the DRC channel on remaining timeslots in the short timescale DTX mode.

26. The access terminal of claim 24, further comprising: means for aligning ON and OFF periods of the long timescale DTX mode with a data rate control (DRC) lock boundary.

27. The access terminal of claim 24, further comprising: means for freezing closed-loop power control during OFF periods of the long-timescale DTX mode.

28. The access terminal of claim 24, further comprising: means for preventing the long timescale DTX mode from being enabled for a predetermined period of time when a transmitter circuit of the access terminal is powered ON after being powered OFF.

29. The access terminal of claim 24, further comprising: means for skipping data rate control (DRC) lock decisions when the long timescale DTX mode is enabled.

30. The access terminal of claim 24, further comprising: means for jointly determining whether the first set of predetermined factors are present when the access terminal is in multi-carrier operation.

31. A non-transitory computer-readable storage medium, comprising programming for causing a computer to:
 determine whether a first set of predetermined factors are present;
 enable a short timescale DTX mode when the first set of predetermined factors are determined to be present, wherein the short timescale DTX mode is enabled independent of whether a long timescale DTX mode is also enabled;
 determine whether a second set of predetermined factors are present; and
 enable the long timescale DTX mode when the second set of predetermined factors are determined to be present, wherein the long timescale DTX mode is enabled independent of whether the short timescale DTX mode is also enabled.

32. The computer-readable storage medium of claim 31, wherein the first set of predetermined factors comprises one or more factors selected from a first group of factors comprising:
 a determination that the computer is configured to communicate in 1xEV-DO revision A, 1xEV-DO revision B, or both;
 a determination that network-side DTX has not been enabled on the computer;
 a determination that a length of a data rate control field (DRC) is equal to or greater than a predetermined threshold;
 a determination that there is no reverse link traffic; and
 a determination that there has been no forward link traffic for a duration of a predetermined threshold.

33. The computer-readable storage medium of claim 31, wherein the second set of predetermined factors comprises one or more factors selected from a second group of factors comprising:
 a determination that there is no reverse link traffic;
 a determination that there has been no forward link traffic for a duration of a predetermined threshold;
 a determination that the computer is not in a handoff mode;
 a determination that a current network load is below a predetermined load threshold; and
 a determination that a length of a data rate control (DRC) lock is less than or equal to a length of a data source control (DSC).

34. The computer-readable storage medium of claim 31, further comprising programming for causing a computer to: align ON and OFF periods of the long timescale DTX mode with a data rate control (DRC) lock boundary.

35. The computer-readable storage medium of claim 31, further comprising programming for causing a computer to:
 prevent the long timescale DTX mode from being enabled for a predetermined period of time when a transmitter circuit of the access terminal is powered ON after being powered OFF for a period of time.

36. The computer-readable storage medium of claim 31, further comprising programming for causing a computer to: offset a timing of ON and OFF periods for the short timescale DTX mode with a known frame offset.

37. The computer-readable storage medium of claim 31, further comprising programming for causing a computer to: freeze closed-loop power control during OFF periods of the long-timescale DTX mode.

38. The computer-readable storage medium of claim 31, further comprising programming for causing a computer to: selectively skip some data rate control (DRC) lock decisions when the long timescale DTX mode is enabled.

39. The computer-readable storage medium of claim 31, further comprising programming for causing a computer to: jointly determine whether the first set of predetermined factors are present when the access terminal is in multi-carrier operation.

* * * * *